United States Patent [19]
Einarsson

[11] 3,872,908
[45] Mar. 25, 1975

[54] RETRACTABLE STUDDED TIRE
[76] Inventor: Einar Einarsson, Eyjabakki 2 Reykjavik, Iceland
[22] Filed: Aug. 24, 1973
[21] Appl. No.: 391,071

[52] U.S. Cl. ............................................. 152/208
[51] Int. Cl. ........................................... B60c 11/14
[58] Field of Search .......... 152/208, 210, 212, 337, 152/338, 341, 342

[56] References Cited
UNITED STATES PATENTS
2,674,292 4/1954 Sutton ............................... 152/342
3,516,466 6/1970 Smit .................................. 152/208
3,672,421 6/1972 Anderson ........................... 152/208
3,712,358 1/1973 Einarsson ........................... 152/208

FOREIGN PATENTS OR APPLICATIONS
503,764 6/1954 Canada .............................. 152/208

Primary Examiner—Stanley H. Tollberg
Assistant Examiner—Charles A. Marmor
Attorney, Agent, or Firm—Lockwood, Dewey, Zickert & Alex

[57] ABSTRACT

The retractable studded tire includes studs in the tread wall movable between extended road-engaging and retracted non-road-engaging positions, and a self-contained power unit for selectively causing extension or traction of the studs. The power unit includes a high pressure air chamber and a low pressure air chamber for controlling stud position and the low pressure air chamber additionally maintains the tire in inflated condition. The studs are movable in stud holes formed in the tread wall and a diaphragm is provided for pneumatically sealing the area around the studs and stud holes from the low pressure air chamber to prevent leakage of air from the low pressure chamber.

21 Claims, 16 Drawing Figures

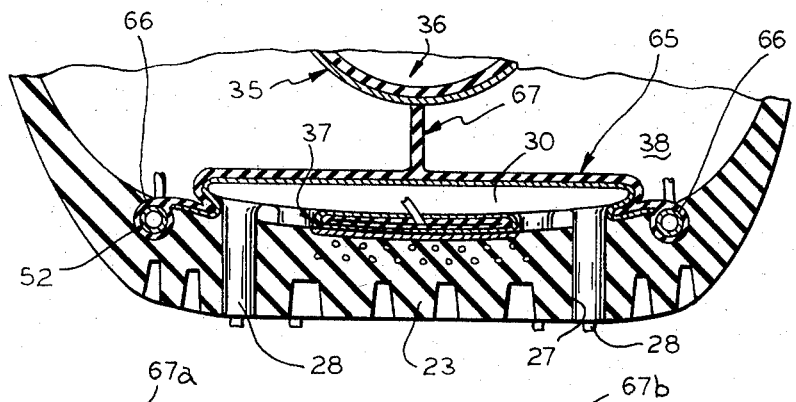
FIG. 6
FIG. 8     FIG. 9
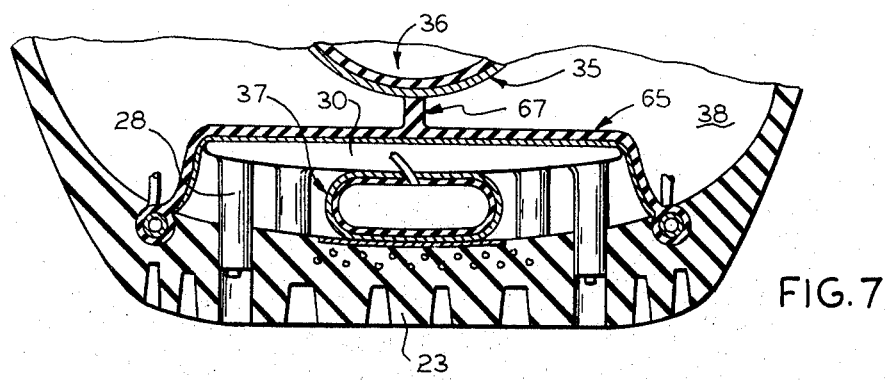
FIG. 7
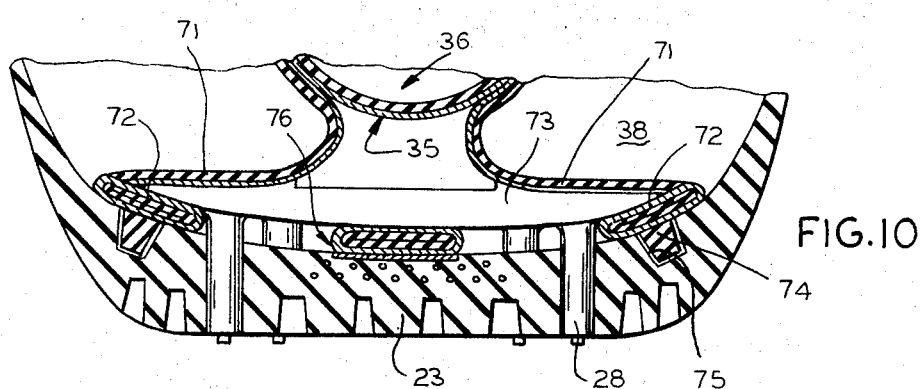
FIG. 10
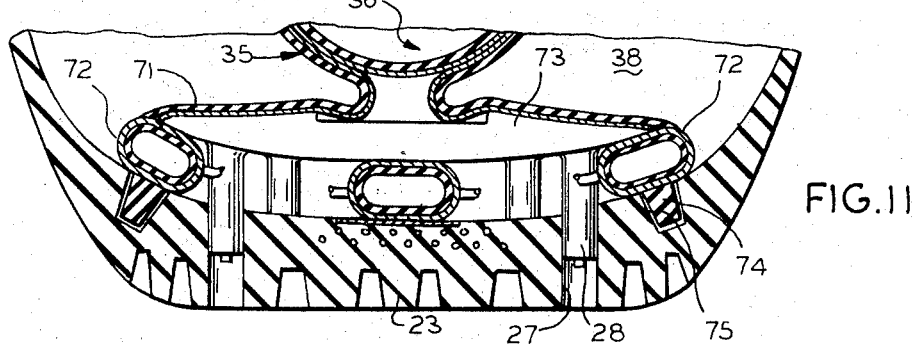
FIG. 11

RETRACTABLE STUDDED TIRE

This invention relates in general to a retractable studded vehicle tire, and more particularly to an anti-skid vehicle tire having studs movable in the tread wall between road-engaging and non-road-engaging positions by a self-contained power unit, and still more particularly to an improved retractable studded tubeless tire.

The retractable studded tire of the invention is an improvement over my tire disclosed in my previous U.S. Pat. No. 3,712,354. Specifically, the tire according to this invention includes means pneumatically sealing off the area where the studs are located and movable in the stud holes of the tread wall so that leakage from the low pressure chamber in the tire which maintains the tire in inflated condition is minimized and substantially eliminated. Additionally, the tire according to the present invention includes stud mounting plates arranged within the tire casing which facilitate replacement of worn or broken studs. Moreover, the entire assembly of studs and power unit for controlling studs is easily removable from a tire casing so that it may be removed from a worn or damaged tire casing to be thereafter used in a new tire casing, thereby reducing new tire replacement costs.

It is therefore an object of the present invention to provide a new and improved retractable studded tire.

A further object of this invention is to provide a retractable studded tire of the type disclosed in my aforesaid patent which includes means for sealing around the studs in stud holes to eliminate leakage of air pressure from within the tire casing.

A still further object of this invention is to provide an improved retractable studded tire which includes stud plates for removably mounting the studs so that the studs may be easily and inexpensively replaced when worn or broken.

Another object of the invention is to provide a studs and power unit assembly for a tubeless tire that may be removable and mountable in a new tire casing to reduce tire replacement costs. It is also an object to provide a studs and power unit assembly for a retractable studded tire that prevents tire deflation upon punctures in the tread wall.

Other objects, features and advantages of the invention will be apparent from the following detailed disclosure, taken in conjunction with the accompanying sheets of drawings, wherein like reference numerals refer to like parts, in which:

FIG. 6 is a fragmentary transverse sectional view taken through a vehicle tire according to the invention and illustrating a modified sealing means for sealing off the area of the studs and stud holes and illustrating the studs in extending position;

FIG. 7 is a view similar to FIG. 6 but illustrating the studs in retracted position;

FIG. 8 is a side elevational view of one form of web arranged between the diaphragm and high pressure tube of the embodiment of FIGS. 6 and 7;

FIG. 9 is a side elevational view of another form of web that may be used in place of the web shown in FIG. 8;

FIG. 10 is a view similar to FIG. 6 but illustrating another form of socket means for sealing with the inside of the tread wall and illustrating the studs in extended position;

FIG. 11 is a view similar to FIG. 10 but showing the studs in retracted position;

The retractable studded tire of the invention is useful on any vehicle where it is desired to improve the traction on slippery road surfaces and particularly icy road surfaces. Accordingly, the invention may be used on automobiles, trucks, aircraft or any other type of rubber-tired vehicle. The tire according to the invention includes a self-contained power unit for extending and retracting studs between road-engaging and non-road-engaging positions wherein the mere manual operation of a valve mounted on the wheel rim of the tire effects stud extension or retraction. The present invention is primarily applicable to tubeless tires wherein the studs and power unit assembly is removably mountable in a tire casing so that a worn or damaged tire casing may be replaced without replacement of the studs and power unit assembly. Moreover, the studs and power unit assembly is capable of minimizing, if not actually preventing, leakage of inflation air through the tread wall where openings are provided for the studs. It will also be hereinafter appreciated that the studs and power unit assembly provides additional protection against tire deflation in the event of a puncture in the tread wall as well as protection against complete deflation in the event of failure at a side wall of the tire casing.

Figure 1:
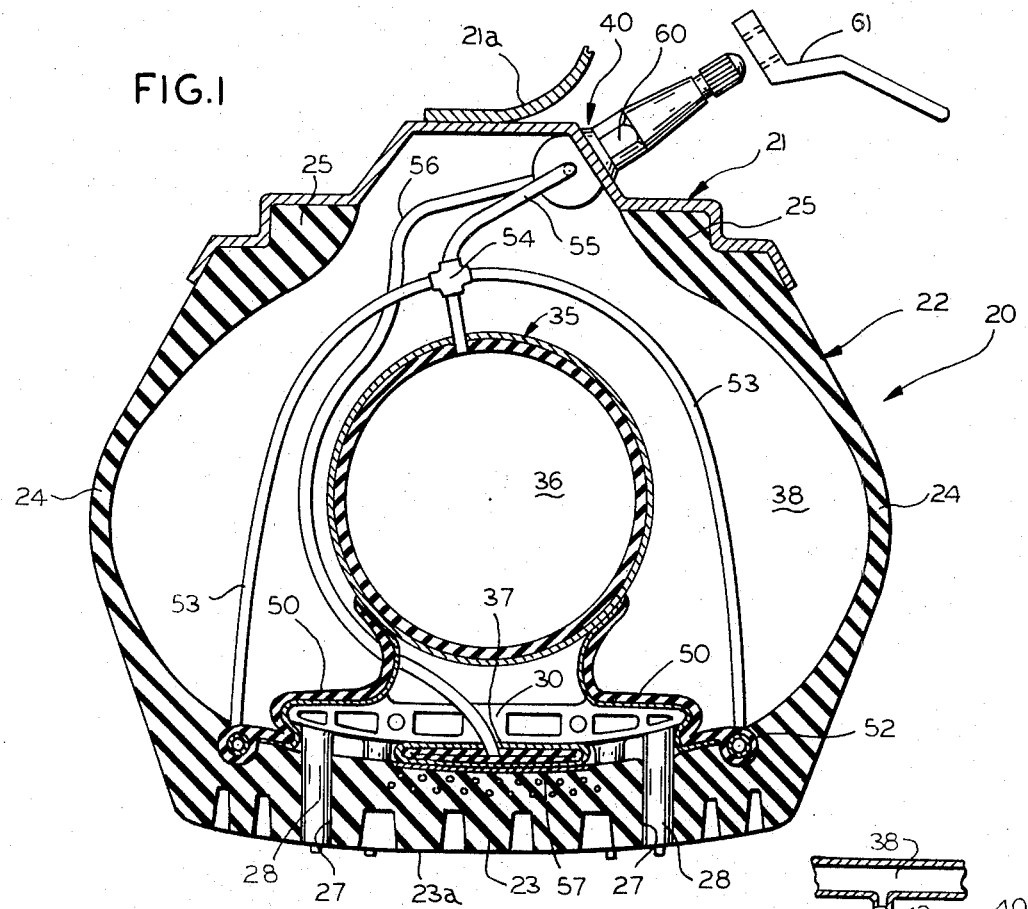
FIG. 1 is a transverse sectional view taken through a tubeless vehicle tire mounted on a wheel rim employing the present invention and illustrating the studs in extended road-engaging position.
Figure 2:
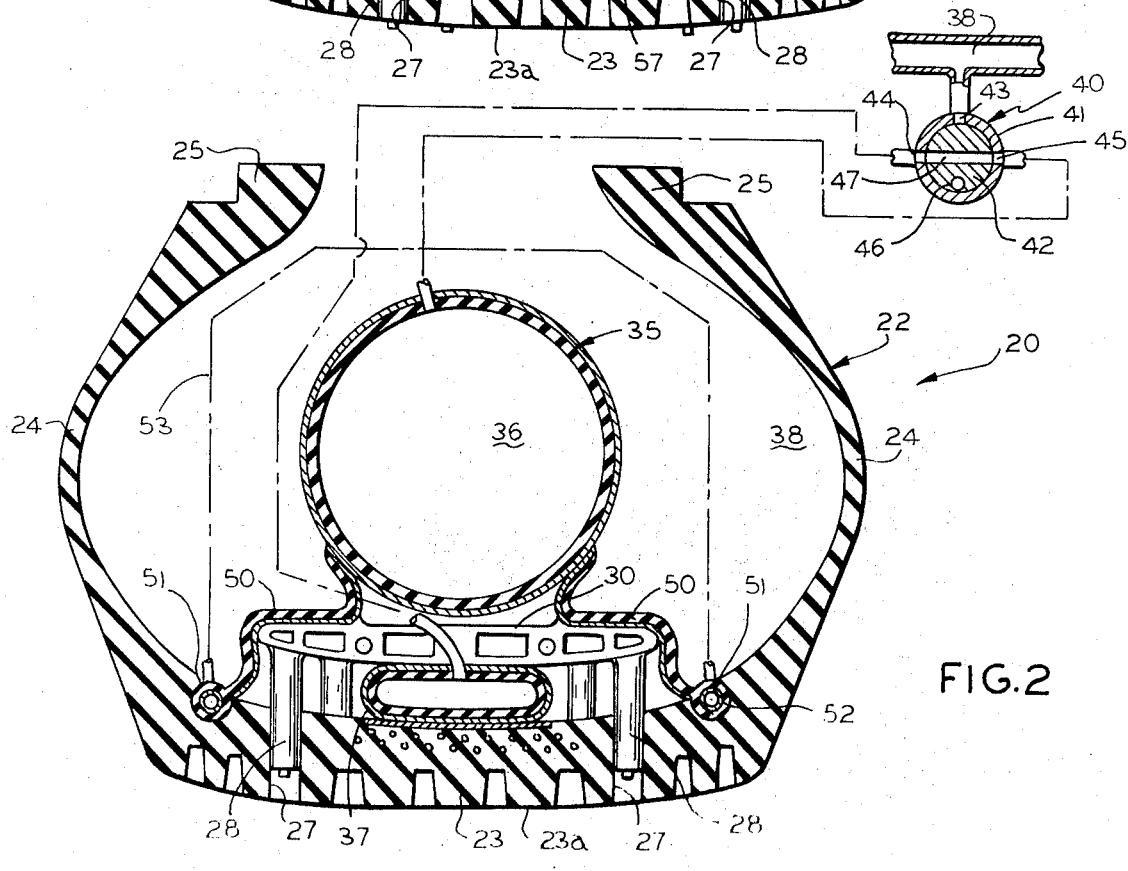
FIG. 2 is a view similar to FIG. 1 but illustrating the studs in retracted position and a schematic diagram of the control valve and its connections to the self-contained power unit for controlling stud position.
Figure 3:
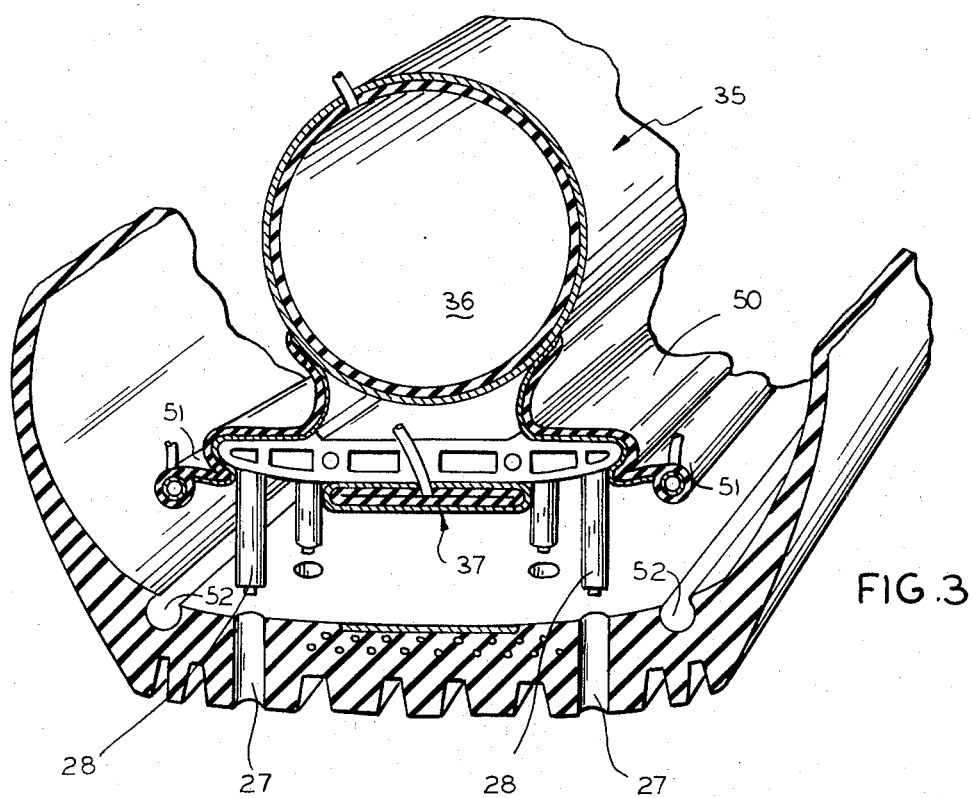
FIG. 3 is a somewhat perspective and exploded broken view of a tire having the arrangement shown in FIGS. 1 and 2 to illustrate the manner in which the self-contained power unit and studs would be mounted in the tire casing.

Referring now to the drawings and particularly to the embodiment of FIGS. 1 to 5, the retractable studded tire according to the invention is illustrated as a tubeless tire wherein a studs and power unit assembly combines with a tire casing to define the stud retracting function. The tire illustrated in FIGS. 1 to 3 is generally designated by the numeral 20 and is shown as being mounted on a wheel rim 21 of the vehicle wheel 21a. The tire includes a tire casing 22 having a peripherally extending tread wall 23 having a tread face 23a, and opposed side walls 24. The side walls extend from the tread wall and terminate in beads 25 which engage the wheel rim 21 in sealing relation.

A plurality of stud holes 27 are formed in a suitable pattern in the tread wall 23 for receiving studs 28. The number of holes and studs may vary depending upon the design of the tire. Moreover, the studs may be arranged in suitable circumferentially spaced relation, staggered or in straight-line form. The studs may be made of any suitable material, such as a metal or a plastic, wherein at least the road-engaging portion of the stud be of a suitable hardened material, such as tungsten carbide or the like.

Figure 4:
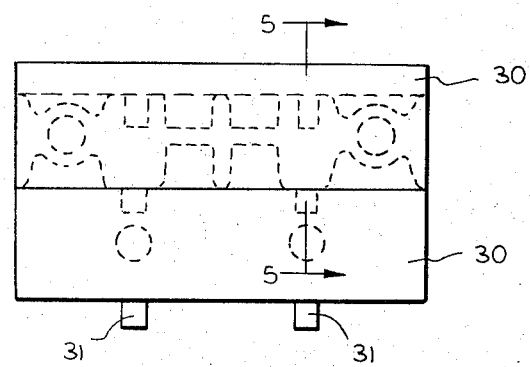
FIG. 4 is a plan view of a pair of stud plates shown in coacting aligned relation.
Figure 5:
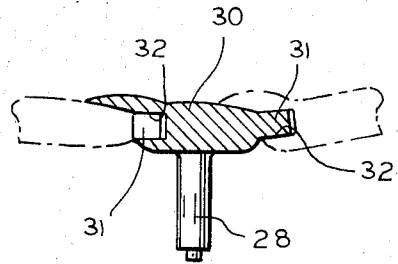
FIG. 5 is a sectional view taken substantially along line 5—5 of FIG. 4.

The studs 28 are suitably supported on stud carriers or stud plates 30 which are arranged within the tire casing in end-to-end relationship. As seen in FIG. 4 and in FIG. 5, the interrelationship between adjacent stud carriers or stud plates 30 is such that they are maintained in alignment circumferentially and laterally by means of coacting aligning pins 31 and sockets 32. While the studs are shown integral with the stud carriers or plates 30 in FIGS. 1 to 5, it will be appreciated that they may be removably mounted to the stud carriers as shown in a later embodiment, such as that in FIGS. 13 to 15. Upon movement of the stud plates and studs from the position where the studs are in road-engaging position as shown in FIG. 1 and where they are in non-road-engaging position as shown in FIG. 2, it will be appreciated that the stud carriers move radially outwardly and inwardly and therefore move circumferentially relative to each other. Moreover, the entire line of stud plates and studs may be seen as a belt extending circumferentially within the tire casing to which the studs are attached and which moves together both radially inwardly and outwardly during stud extension and retraction operations. Accordingly, all of the stud plates move together during extension and retraction of the studs. The stud plates or carriers are about the same or slightly less than the width of the tread wall. The stud carriers may be of the same material as the studs, such as metal or plastic.

The self-contained power means utilized for obtaining stud extension and retraction includes a high pressure tube 35 arranged within the casing and defining a high pressure air chamber 36 when suitably pressurized to power an expansible stud actuating tube 37 arranged between the stud carriers and the tread wall, as well as a sealing ring which will be more clearly hereinafter described. Additionally, a low pressure chamber 38 assists in controlling the position of the studs. The low pressure chamber surrounds the high pressure tube 35 and also maintains the tire in inflated condition. Accordingly, the low pressure chamber is essentially defined by the tire casing and the wheel rim 21 in the usual manner of a tubeless tire.

A control valve 40 suitably mounted on the wheel rim 21 serves to control the operation of the studs between extended and retracted position. The control valve operates as the self-contained power means arrangement described in the aforesaid patent wherein it first functions as a valve to permit the admission of air into both the high pressure and low pressure chambers and secondly to control the air pressure in the stud actuating tube 37. The control valve 40, shown schematically in FIG. 2, includes a body 41 rotatably mounting therein a plug 42. The body includes ports 43, 44 and 45, while the plug includes a vent port 46 leading to atmosphere. The plug 42 also includes a diametrically extending passageway 47 which when aligned with the ports 44 and 45, as shown in FIG. 2, intercommunicates the high pressure chamber 36 with the expansible tube 37 to cause retraction of the stud plates and studs, as illustrated in FIG. 2. Turning of the plug 42 ninety degrees clockwise, as viewed in FIG. 2, then connects the vent port 46 of the plug with the expansible tube 37 to vent the tube 37 to atmosphere and allow it to collapse and permit the stud carriers and studs to move toward the tread wall to the position shown in FIG. 1 wherein the studs then are in extended position for road-engaging contact. While not shown but as illustrated in the aforesaid patent, a passageway extends from the passageway 47 to the usual valve core for permitting the initial filling of the low pressure and high pressure chambers, as the passageway 47 is either aligned with the low pressure chamber port 43 or the high pressure chamber port 45. Suitable detent or stop means and indication means may be provided for assuring alignment of the passageway 47 with either the port 43 or the port 44 and also alignment of the vent port 46 with the port 44.

The manner in which the area around the studs and stud holes is sealed from the low pressure chamber 38 constitutes an important feature of the present invention in order to prevent leakage of air from the low pressure chamber through the tread wall. An air impermeable diaphragm means is provided which essentially closes off the area of the studs and stud holes by sealing at the opposite sides of the tread wall and opposite sides of the stud hole area, as particularly seen in FIGS. 1, 2 and 3 and at the high pressure tube. The diaphragm sealing means includes a pair of resilient or flexible straps or sealing panels 50 of air impermeable material in annular form attached at their inner edges in a suitable fashion to the high air pressure tube 35 and formed at their outer edges with an annular locking and sealing edge 51 removably received in annular grooves 52 formed in the tire casing at the inner surface of the casing and adjacent the opposite edges of the tread wall 23. The locking edges 51 are in the form of small high pressure tubes of limited expansion and which are in constant communication with the high pressure tube 35 by a line 53. Accordingly, the pressure in the locking edges is the same as in the high pressure tube 35. The connecting line 53 leads to a common fitting 54 that is also connected to the high pressure line 55 which interconnects the high pressure port 45 of the control valve to the high pressure tube. Accordingly, the locking edges 51 on each side of the tread wall are continually in communication through the connecting lines 53 to the high pressure chamber 36 so that they are always expanded to their limit by the high pressure in the air chamber. As seen particularly in FIG. 1, a connecting line 56 interconnects the port 44 of the control valve with the actuating tube 37. The annular grooves 52, which receive the locking edges 51, are sized so that when the expansible locking edges are deflated, they can be inserted, and thereafter following inflation, the edges sealingly lock in the grooves and cannot be dislodged. More than one-half of the surface of the high pressure tubes 51 are engaged within the grooves and therefore locked in place. This positively prevents dislodging of the locking edges from the grooves during operation of the tire and also provides a sealing action against air leakage between the locking edges and the grooves. It should be further appreciated that preferably a metal strip 57 is provided between the stud actuating tube 37 and the tread wall 23 to prevent bulging of the tread wall when the actuating tube is inflated.

It will be appreciated that the high pressure air tube 35, together with the stud operating tube 37, the straps 50 and the locking edges 51, are formed of a material which limits the stretching of these elements. More specifically, the material may be a layer of natural or synthetic rubber laminated to a layer of nylon cloth wherein the rubber layer will prevent air leakage while the nylon cloth will prevent undue stretching. Alternatively, the anti-stretch layer may be totally embedded in the rubber layer. If desired, the grooves 52 may be lined with a hard material, such as a hard plastic to assist in providing a sealing relation with the locking edges of the straps 50.

The stud plates or carriers 30 and the studs may be made of any suitable material such as a durable plastic or a metal, except the very tip ends of the studs would be of a hardened material such as tungsten carbide to provide good wearing qualities where it engages the road. As seen particularly in FIG. 1, the annular straps 50 are fitted over the opposite sides of the stud carriers and may be bonded thereto if desired, wherein upon collapse of the stud actuating tube 37, the pressure from the low pressure air chamber 38 bears against the straps 50, which in turn forces the stud carriers to move outwardly radially and thereby force the studs into road-engaging position, as shown in FIG. 1. It can be appreciated that the valve 40, which controls the operation of stud movement, includes a wrench-engaging surface 60 for receiving a wrench 61, which permits rotation of the plug 42 to either of the positions heretofore described and shown schematically in FIG. 2 for operation of the studs.

The embodiment of FIGS. 6 and 7 differs from the embodiment of FIGS. 1 to 3 only in that the diaphragm means for sealing off the area of the studs and stud holes is in a single piece in the form of an annular strap 65 having the tube type locking edges 66 formed at opposite edges. Accordingly, the strap 65 is in one piece instead of being in two pieces, as shown in the embodiment of FIGS. 1 to 3. The strap 65 is connected to the high pressure air tube 35 by means of an annular web 67 extending between the strap 65 and the tube 35. This annular web may be solid as illustrated in FIG. 8 and identified as 67a or slotted as shown in FIG. 9 and identified as 67b. It will be appreciated that the tube type locking edges 66 are continually connected to the high pressure chamber 36, as in the embodiment of FIGS. 1 to 3, to lock in sealing relation the opposite edges of the strap 65 to the inner surface of the tread wall 23. In addition to the locking action of the tube type locking edges 66 with the grooves 52 formed in the tire casing, it can be appreciated that the pressure exerted by the low pressure air chamber 38 against the locking edges 66 assists in maintaining them in position in the grooves and in sealing relation therewith. The operation of this embodiment is the same as that of the embodiment of FIGS. 1 to 3 wherein the studs are in extended position, as shown in FIG. 6, when the stud actuating tube 37 is collapsed and in retracted position, as shown in FIG. 7, when the tube 37 is expanded by virtue of being in communication with the high pressure air chamber 36.

The embodiment of FIGS. 10 and 11 differs primarily from the previous embodiments in providing a solid locking edge for wedge engagement in annular grooves formed in the tire casing and secondarily in providing additional stud actuating tubes for retracting the studs to retracted position. The air impermeable diaphragm means sealing the area about the studs and stud holes includes a pair of annular straps 71 suitably fastened at their inner edges to the high pressure air tube 35 in a similar fashion to the straps 50 in the embodiment of FIGS. 1 to 3 and suitably connected at their outer edges to stud actuating tubes 72 that are positioned between the outer edges of the stud carriers or plates 73 and the tire casing. Frusto-conical in cross-section annular locking edges 74 are suitably attached to the outer sides of the stud actuating tube 72 and are sealingly received in mating annular grooves 75 formed in the tire casing. Accordingly, the annular straps 71 are sealingly fastened to the high pressure air tube 35 and provided with locking edges 74 for engaging in a sealing fashion the inner sides of the tire casing in order to prevent air leakage between the low pressure chamber and the area within which the studs and stud holes are mounted. To further assist in retracting the studs, a third stud actuating tube 76 is provided which is positioned between the stud carrier plates 73 and the tread wall 23 at the central area of the stud plates. Accordingly, it may be appreciated that the stud actuating tubes 72 and 76 are all connected to the control valve 40 for selective communication with the high pressure air chamber 36 to cause stud retraction, as shown in FIG. 11, or with the atmosphere to allow collapse and stud extension, as shown in FIG. 10, by virtue of the pressure in the low pressure air chamber 38 bearing against the straps 71 and the stud carrying plates.

Figure 12:
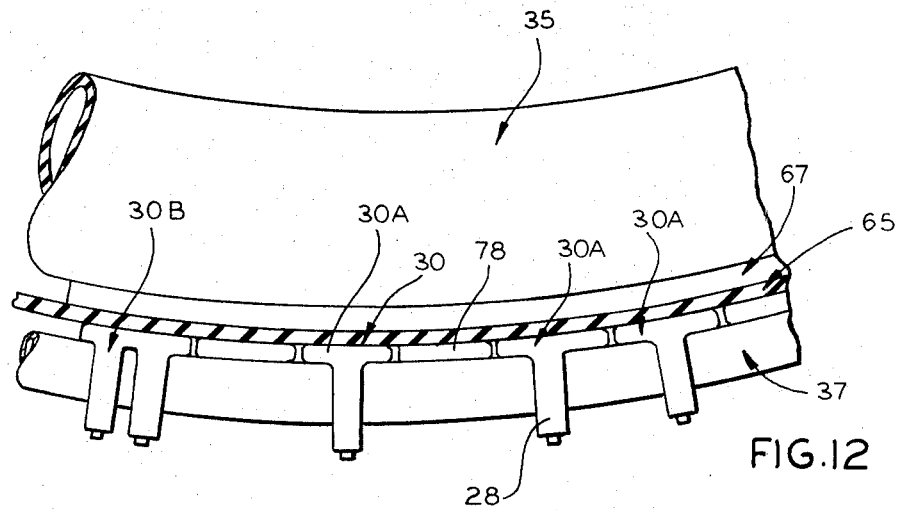
FIG. 12 is a side elevational view of a broken high pressure tube and stud assembly of the embodiment shown in FIG. 3.

FIG. 12 is a view of the embodiment of FIGS. 6 and 7 illustrating the relationship between the high pressure air tube 35, the stud plates 30 and studs 28 and the stud actuating tube 37. Moreover, this view illustrates how the stud plates may carry a single stud on opposite sides, as shown by the stud plates 30A or a pair of studs on each side, as shown by the stud plate 30B. Additionally, it can be appreciated that the stud carrying plates may be arranged in directly abutting relation or may be separated from each other, such as by spacer plates 78.

While the embodiments thus described have shown the studs to be integrally mounted with the stud carriers wherein replacement of a worn or broken stud necessitates replacement of the stud carrier and the studs attached thereto, it can be appreciated that stud plates may be formed having replaceable studs wherein it is necessary to replace only a worn or broken stud rather than to replace the entire stud carrier or plate. Referring now to the embodiment of FIGS. 13 to 15, a stud carrier or plate 83 is illustrated having stud slots 84 formed in the opposite edges for receiving replaceable studs 85. The stud slots 84 open to the opposite edges of the stud carriers 83 and also toward the bottom sides and include a locking groove 86 for receiving a flanged head 87 of each stud. Accordingly, the studs may slide along the slots 84 to any desired position and be held against relative movement along their axis with respect to the stud carriers. It can therefore be seen replacement of a stud 85 can easily be accomplished by removing the old stud from the slot 84 by sliding it outwardly and inserting a new stud in its place. This eliminates the necessity of replacing the entire stud carrier when repairing a broken or worn stud. Additionally, the stud carriers 83 differ from those shown in FIGS. 4 and 5 in providing an elongated socket 91 of the next adjacent stud plate or spacer. Accordingly, the adjacent stud plates or spacers are maintained in alignment during their movement between extended and retracted positions.

Figure 14:
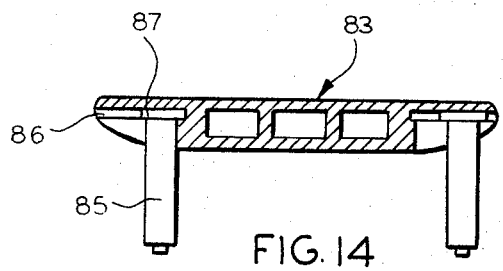
FIG. 14 is a transverse sectional view taken substantially along line 14—14 of FIG. 13.
Figure 15:
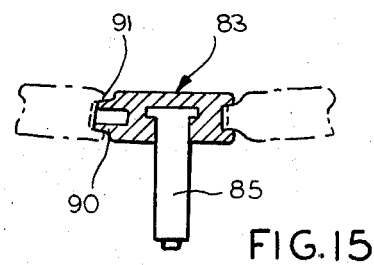
FIG. 15 is a sectional view taken substantially along line 15—15 of FIG. 13.
Figure 13:
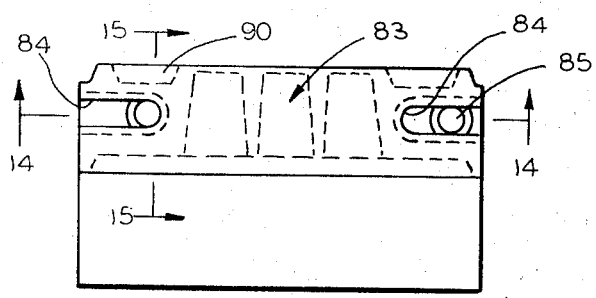
FIG. 13 is a bottom plan view of a modified stud carrying plate.
Figure 16:
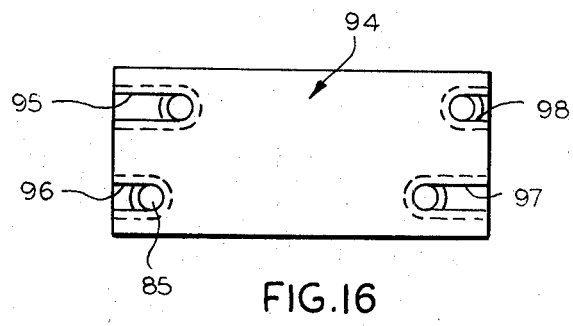
FIG. 16 is a bottom plan view of another form of stud carrying plate wherein the plate includes a plurality of studs at each side thereof.

While the stud carriers 83 in the embodiment of FIGS. 13 to 15 are illustrated as being capable of supporting one stud at each of the opposite edges, it should be appreciated that the carrier may be sized and formed to carry two or more studs at opposite edges, as shown by the stud carrier 94 illustrated in FIG. 16. This stud carrier includes long and short stud slots 95 and 96 along one edge and long and short stud slots 97 and 98 along the other edge, all of which receive studs 85 of the same type, as shown in FIGS. 13 to 15. The depth of the stud slots regulates the position of the studs when they are in bottomed relation with the stud slot, and it can be appreciated that the depth may be of any suitable dimension. This embodiment merely illustrates the mounting of a plurality of studs at each edge of a stud carrier. While not shown, any type of guide means may be provided for aligning this stud carrier with an adjacent stud carrier or spacer.

From the foregoing, it can be appreciated that since the area about the studs and stud holes on the tread wall is isolated from the low pressure chamber which maintains the tire in inflated condition, a puncture of the tread wall in this area will not cause deflation of the tire. This provides an added safety feature for the tire. Moreover, in the event a nail does penetrate the tread wall, it will not thereafter penetrate any of the sealing straps which seal the area about the studs from the low pressure chamber inasmuch as the nail will first engage the belt of stud carriers which are of a hard material and would resist penetration by a nail or similar object. Accordingly, the stud carriers protect the straps which seal the low pressure chamber from the area about the studs and stud holes. The tire according to the invention provides another safety feature in that a rupture or puncture of a side wall will not cause complete collapse of the tire inasmuch as the high pressure chamber in the high pressure tube, which is isolated from the low pressure chamber, will tend to maintain the tire in a somewhat inflated condition for a period of time. This enhances the safety of the vehicle using a tire according to the invention.

It should be further recognized that the studs and power unit assembly of the invention need not be replaced when the tire casing is worn or damaged and that it would be more economical to merely replace the tire casing and mount the studs and power unit assembly in the new tire casing. This will reduce the overall cost of the tire needs for a vehicle when the tread on one tire casing is worn to the extent that it needs to be replaced.

It should be further appreciated that in order to provide sufficient power for retracting the studs into non-road-engaging position, the high pressure tube will be filled to a pressure substantially in excess of the pressure in the low pressure chamber. For example, in a tire of a size for a vehicle that would normally require about 17 pounds of air for inflation purposes, the high pressure tube would preferably carry a pressure of about 90 pounds. Moreover, it should be appreciated that extension of the studs by exhausting the air from the stud actuating tube to atmosphere will not cause any appreciable amount of loss of pressure in the high pressure tube wherein a great number of retraction and extension cycles for the studs can be accomplished before it is necessary to replenish the high pressure tube with air. Further, cycling of the studs between road-engaging and non-road-engaging position several times will have virtually no effect on the inflation condition of the tire.

It will be understood that modifications and variations may be effected without departing from the scope of the novel concepts of the present invention, but it is understood that this application is to be limited only by the scope of the appended claims.

The invention is hereby claimed as follows:

1. In a retractable studded tubeless vehicle tire comprising, a tire casing adapted to be mounted on a wheel rim, said casing including a peripheral tread wall having a plurality of stud holes therein, studs in said holes movable therein between extended road-engaging and retracted non-road-engaging position, self-contained power means within said tire casing operable to selectively cause extension or or retraction of said studs, said power means including a high pressure air chamber providing pneumatic power for causing stud retraction and a low pressure air chamber providing pneumatic power for causing stud extension, said high pressure chamber being defined by tube means, said low pressure air chamber additionally maintaining the tire inflated, air pressure responsive expansible means coacting with said studs and operable by said high pressure air chamber to control stud position, and valve means mounted on the wheel rim for selectively intercommunicating the expansible means with the high pressure air chamber to cause expansion thereof and retraction of the studs or with the atmosphere to cause collapse thereof and extension of the studs, the improvement in means pneumatically sealing the studs and stud holes from the low pressure air chamber to prevent loss of tire inflation air, said pneumatic sealing means including circumferentially extending annular grooves along the inside of the tire casing, one at each edge of the tread wall outside of the stud holes area, an air impermeable diaphragm means within the casing across the tread wall and stud holes area, and locking edges on the diaphragm means mating with and sealingly engaging in said grooves to pneumatically isolate the studs and stud holes from the low pressure air chamber.

2. In the tire as defined in claim 1, wherein each said locking edge includes a solid resilient member shaped to matingly engage in a groove.

3. In the tire as defined in claim 2, wherein each said locking edge and groove are frusto-conical in cross-section.

4. In the tire as defined in claim 1, wherein each said locking edge includes a pneumatically expansible member, means continually connecting said pneumatically expansible members with said high pressure air chamber, and the cross sectional shape of said grooves and locking edges being such to interlock the edges in the grooves when the edges are inflated by the pressure from the high pressure air chamber.

5. In the tire as defined in claim 4, wherein each said locking edge and groove are circular in cross-section.

6. In the tire as defined in claim 1, wherein said pneumatic sealing means further includes means connecting said diaphragm means and said tube means for orienting the tube means within the casing.

7. In the tire as defined in claim 6, wherein said connecting means includes a web.

8. In the tire as defined in claim 7, wherein the web is solid.

9. In the tire as defined in claim 7, wherein the web is slotted.

10. In the tire as defined in claim 1, wherein abutting stud plates are provided between said diaphragm means and said tread wall, and means is provided for connecting the studs to the stud plates.

11. In the tire as defined in claim 10, wherein said diaphragm means is pneumatically forced against the stud plates by the pressure in the low pressure chamber so that collapse of the expansible means by venting to atmosphere will effect extension of the studs.

12. In the tire as defined in claim 10, wherein said stud plates include means coacting to maintain the plates in alignment with each other during radial movement when the studs are retracted and extended.

13. In the tire as defined in claim 10, wherein said studs are integral with said stud plates.

14. In the tire as defined in claim 10, wherein said studs are removable from said stud plates for ease of replacement.

15. In the tire as defined in claim 14, wherein said studs include a flanged head, and said stud plates include slotted sockets for receiving the flanged heads of the studs.

16. In combination with a tubeless tire casing mounted on the wheel rim of a vehicle, a studs and power unit assembly for providing the tire casing with retractable studs, said tire casing including a peripheral tread wall, and an annular groove along the inside of the tire casing at each side of the tread wall, said studs and power unit assembly including a plurality of circumferentially arranged stud carriers adjacent the inside of the tread wall, stud holes in said tread wall, studs supported by and extending from the stud carriers into said stud holes and being slidably received in said holes, a stud actuating tube between the stud carriers, and said tread wall a high pressure supply tube within the casing, diaphragm means within the casing having locking edges matingly connecting in said grooves and sealing around the stud carriers, studs and stud holes between said annular grooves and defining with the casing side walls and rim a low pressure air chamber which maintains the tire casing inflated, and a control valve mounted on the wheel rim for selectively connecting the high pressure supply tube and stud actuating tube to force the stud carriers away from the tread wall and retract the studs to non-road-engaging position or to connect the stud actuating tube to atmosphere thereby collapsing said stud actuating tube whereby the pressure in the low pressure chamber bearing against the diaphragm means which in turn bears against the stud carriers causes the studs to extend from the tread wall into road-engaging position.

17. The combination of claim 16, wherein said studs and stud carriers include means removably mounting the studs on the stud carriers for replacement thereof.

18. The combination of claim 16, wherein said studs are integrally formed on the stud carriers.

19. The combination of claim 16, wherein said studs and power unit assembly is removable from the tire casing for replacement of the tire casing.

20. The combination of claim 16, wherein said locking edges are pneumatic and connected to said high pressure supply tube to sealingly lock in the grooves of the tire casing.

21. The combination of claim 16, wherein said locking edges include solid resilient bars mating in sealing relation with said grooves.

* * * * *